United States Patent
Wimmer et al.

(10) Patent No.: US 12,381,865 B2
(45) Date of Patent: Aug. 5, 2025

(54) COMMUNICATION SYSTEM, ADAPTER FOR A TERMINAL AND METHOD FOR SECURELY TRANSMITTING TIME-CRITICAL DATA WITHIN THE COMMUNICATION SYSTEM

(71) Applicant: Siemens Aktiengesellschaft, Munich (DE)

(72) Inventors: Martin Wimmer, Neubiberg (DE); Stefan Seltzsam, Aying (DE); Jan Herrmann, Munich (DE); Hans Aschauer, Munich (DE); Achim Knebel, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/878,264

(22) PCT Filed: May 26, 2023

(86) PCT No.: PCT/EP2023/064203
§ 371 (c)(1),
(2) Date: Dec. 23, 2024

(87) PCT Pub. No.: WO2024/002597
PCT Pub. Date: Jan. 4, 2024

(65) Prior Publication Data
US 2025/0168152 A1 May 22, 2025

(30) Foreign Application Priority Data
Jun. 29, 2022 (EP) .................................. 22182024

(51) Int. Cl.
*H04L 9/40* (2022.01)

(52) U.S. Cl.
CPC .......... *H04L 63/08* (2013.01); *H04L 63/0281* (2013.01); *H04L 63/20* (2013.01)

(58) Field of Classification Search
CPC ...... H04L 63/08; H04L 63/20; H04L 63/0281
See application file for complete search history.

(56) References Cited

U.S. PATENT DOCUMENTS

| 12,001,529 B1 * | 6/2024 | Anderson ............... G06F 21/31 |
| 2015/0106888 A1 | 4/2015 | Cheng et al. |

(Continued)

FOREIGN PATENT DOCUMENTS

| CN | 104580344 | 4/2015 |
| CN | 111953679 | 11/2020 |

(Continued)

OTHER PUBLICATIONS

PCT International Search Report dated Aug. 30, 2023 based on PCT/PCTEP/064203 filed May 26, 2023.

(Continued)

*Primary Examiner* — Benjamin A Kaplan
(74) *Attorney, Agent, or Firm* — Cozen O'Connor

(57) ABSTRACT

A method for securely transmitting time-critical data within a communication system that includes local networks each having a switch and a plurality of terminals, a controller that controls functions of switches and terminals, and having a control network assigned to the controller and separate from the local networks, where communication within the local networks is implicitly authorized based on an assignment of respective terminals to the same local network, each terminal is assigned a zero trust adapter that captures status information, transfers the status information via the control network to the controller for evaluation and authenticates the terminal to the controller to communication partners, and where the controller determines a trust index for each of the (Continued)

terminals based on the status information and applies rules dependent on the trust index for configuration or permissible communication relationships of the terminals.

17 Claims, 5 Drawing Sheets

(56) References Cited

U.S. PATENT DOCUMENTS

| | | | |
|---|---|---|---|
| 2020/0220846 A1 | 7/2020 | Schwering | |
| 2022/0166788 A1 | 5/2022 | Grammel et al. | |
| 2022/0391503 A1* | 12/2022 | Grajek | G06F 21/606 |

FOREIGN PATENT DOCUMENTS

| | | |
|---|---|---|
| CN | 112055029 | 12/2020 |
| CN | 113487218 | 10/2021 |
| CN | 114024706 | 2/2022 |
| EP | 3646559 | 6/2021 |
| EP | 4283925 B1 | 8/2024 |
| WO | 2020182627 | 9/2020 |

OTHER PUBLICATIONS

Rose Scott et al. "Zero Trust Architecture", NIST Special Publication 800-207, pp. 1-59, Aug. 2020.

Gong Jianfeng et al. "Zero-trusted-based mobile office system security model research"; Information Recording Material, pp. 38-40, Mar. 30, 2022.

\* cited by examiner

FIG 4

| Device-Adapter | Source IP | OS | OS Version | Agent Version | Virus Scanner | Last Virus Scan results | Trust Score |
|---|---|---|---|---|---|---|---|
| 641a0941-a137-4271-8cbc-447e67fedac0 | 10.10.1.20 | Debian | 7 | 1.5 | none detected | | 50 |
| 0049843b-ae60-493b-90f-450ea17ec4e | 10.10.1.25 | Debian | 9 | 2.2 | none detected | | 85 |
| 364d5697-2db6-4e91-8714-d090b2713576 | 10.10.1.30 | Windows | 7 | 1.3 | TrendMicro | nothing found | 85 |

| Rule ID | Source | Destination IP | Destination Port | Protocol | Device Trust Score |
|---|---|---|---|---|---|
| 1 | | 10.10.1.20 | 4840 | OPC UA | 80 |
| 2 | | 10.10.1.20 | 135 | DCOM | 65 |
| 3 | | 10.10.1.25 | 4840 | OPC UA | 70 |
| 4 | 10.10.1.25 | 10.10.1.30 | 502 | Modbus/TC | 85 |

501 / 502 / 503 / 504 / 505 / 506

COMMUNICATION SYSTEM, ADAPTER FOR A TERMINAL AND METHOD FOR SECURELY TRANSMITTING TIME-CRITICAL DATA WITHIN THE COMMUNICATION SYSTEM

CROSS-REFERENCE TO RELATED APPLICATIONS

This is a U.S. national stage of application No. PCT/EP2023/064203 filed 26 May 2023. Priority is claimed on European Application No. 22182024.4 filed 29 Jun. 2022, the content of which is incorporated herein by reference in its entirety.

BACKGROUND OF THE INVENTION

1. Field of the Invention

The present invention relates to a method securely transmitting time-critical data within a communication system, in particular a communication system for an industrial automation system, a communication system for implementing the method and an adapter for a terminal of the communication system.

2. Description of the Related Art

Industrial automation systems usually comprise a multiplicity of automation devices networked to one another via an industrial communication network and, within the scope of production or process automation, are used to control or regulate installations, machines or devices. On account of time-critical boundary conditions in industrial automation systems, real-time communication protocols, such as PROFINET, PROFIBUS, Real-Time Ethernet or Time-Sensitive Networking (TSN), are predominantly used for communication between automation devices. In particular, control services or applications can be automatically distributed to currently available services or virtual machines of an industrial automation system depending on the workload.

A method for checking datagrams transmitted within an industrial automation system containing a plurality of automation cells is disclosed in EP 3 646 559 B1 in which datagrams to be checked are transmitted out of the automation cells to a firewall system via a respective firewall interface for checking and are then checked in a rule-based manner. The firewall system is formed by at least one virtual machine provided in a data processing system comprising a plurality of computer units. For the transmission of the datagrams to be checked, in each case a data link layer tunnel is built between the respective firewall interface and the firewall system. Both datagrams to be checked and at least successfully checked datagrams are transmitted within the respective data link layer tunnel.

WO 2020/182627 A1 describes a method for monitoring the integrity of an industrial cyber-physical system in which measurement data that have been obtained with various sensors of the cyber-physical system or control data intended for various actuators of the cyber-physical system are provided or tapped. In addition, at least one measurement data context parameter between the measurement data obtained with the various sensors is acquired or at least one control data context parameter is determined between the control data intended for the various actuators. The at least one measurement data context parameter is compared with a measurement data context reference or the at least one control data context parameter is compared with a control data context reference. The integrity of the cyber-physical system to be monitored is assessed on the basis of the comparison.

The older European patent application with the application file number 22175490.6 relates to the secured transmission of time-critical data within a communication system comprising a plurality of local networks in which data is transmitted via switching, at least one network superimposed with respect to the local networks in which data is transmitted via routing and a gateway system for connecting the communication system to at least one unsecured external network. Network layer communication via the superimposed network is only authorized between authenticated system components. Switches authenticate each connected terminals and assigns them to a physical or logical local network in accordance with a respective terminal identity. Security layer communication is authorized within the local networks implicitly based on an assignment of the respective terminals to the same local network. Communication at Open Systems Interconnection (OSI) layer 3-7 between terminals of different local networks or with terminals in the unsecured external network is authorized via zero trust proxies that are each assigned to a local network.

Zero trust concepts provide for users or devices, regardless of their respective position or environment, to authenticate themselves to communication partners or when accessing protected resources in order to be able to access desired data or applications after successful authentication for example. In industrial automation systems, the problem with the application of zero trust concepts is that not every user or every device can perform authentication, in particular from an economic point of view. An application of zero trust concepts usually requires additional cryptographic functionality (for example, trust anchor) and key material (for example, device certificates) or computing power, which is not always freely available in existing hardware components. In addition, existing security or communication protocols in industrial automation systems cannot be easily adapted or replaced to implement zero trust concepts. In addition to data security, deterministic data transmission and processing must also be ensured in communication networks of industrial automation systems. In industrial automation systems, deterministic behavior is required in particular to ensure functional safety. However, the mutual authentication of communication partners provided for in zero trust concepts makes deterministic data transmission and processing more difficult.

SUMMARY OF THE INVENTION

In view of the foregoing, it is therefore an object of the invention to provide a method for securely transmitting time-critical data that can be easily integrated into existing communication systems and that enables data security and determinism to be guaranteed simultaneously, particularly in industrial automation systems and to provide a suitable apparatus for the technical implementation of the method.

These and other objects and advantages are achieved in accordance with the invention by a communication system, an adapter and by a method for securely transmitting time-critical data within a communication system, where the communication system comprises a plurality of local networks, a control unit and a control network assigned to the control unit which is separate from the local networks. The local networks each comprise at least one switch and a plurality of terminals, where the control unit controls the functions of a plurality of switches and terminals. Communication within the local networks is implicitly authorized based on an assignment of the respective terminals to the same local network.

The switches of the local networks are preferably assigned to a software-defined network (SDN) that comprises a communication control plane referred to as the control plane and a data transmission plane referred to as the data plane. Herein, the control unit is assigned to the control plane, while the switches are assigned to the data plane. In particular, the control unit can specify flow tables from which routing tables or forwarding tables for network infrastructure devices assigned to the control unit are derived. Herein, the network infrastructure devices comprise routers or switches, for example.

In accordance with the invention, each terminal is assigned a zero trust adapter, which captures status information pertaining to the terminal, forwards the status information pertaining to the terminal via the control network to the control unit for evaluation and authenticates the terminal to the control unit or to communication partners. The zero trust adapters can, for example, each be integrated into the respective terminal as hardware and/or software components. In accordance with an alternative embodiment, the zero trust adapters each comprise a zero trust agent integrated into the respective terminal, which captures the status information, and a zero trust interface device separate from the respective terminal, which authenticates the terminal. Moreover, the zero trust adapters can also be combined in a common zero trust proxy for a plurality of terminals.

In accordance with the invention, the control unit determines a trust score for each of the terminals based on the status information and applies rules for configuration or for permissible communication relationships of the terminals, where the rules are dependent on the trust score. In accordance with the rules applied by the control unit, communication relationships of the terminals with communication partners outside their respective local network are, for example, authorized. In particular, the functions of the terminals or switches can be controlled in accordance with the rules applied by the control unit. Preferably, the rules dependent on the trust score are only applied after each successful terminal authentication. In the event of each failed terminal authentication, a warning is advantageously issued.

In particular, the zero trust adapters mean the present invention enables the integration of zero trust concepts into industrial communication or automation systems with little effort. This is in particular advantageous with an existing infrastructure whose components cannot be easily replaced. Integration is further simplified if the zero trust adapters case comprise a trust anchor for storing adapter-specific or terminal-specific key material. In addition, the implementation of zero trust control functions within a separate control network ensures that the function and behavior of an existing industrial communication or automation system is not adversely affected or changed. For this purpose, the terminals are each preferably connected to a zero trust interface device or to the control network via a dedicated port.

In accordance with a preferred embodiment of the present invention, the status information is preprocessed by the respective zero trust adapter for the control unit. Herein, advantageously only the preprocessed status information or meta information extracted from the status information is forwarded to the control unit for evaluation. The status information can in particular comprise log files that are collected, preprocessed and forwarded to the control unit by the respective zero trust adapter. This enables an even more precise evaluation of the terminals with regard to their security status or any security risks.

Preferably, the rules applied by the control unit in dependence on the trust score are specified by security policies. These security policies define which terminals or users require access to which data and/or resources. This enables selective and efficient access control. Herein, the status information is advantageously evaluated based on the security policies by a policy decision point (PDP) assigned to the control facility. The security policies are preferably enforced by the control facility as a policy enforcement point.

The communication system in accordance with the invention is provided for performing the method in accordance with disclosed embodiments and comprises a plurality of local networks, which each comprise at least one switch and a plurality of terminals, a control unit that controls the functions of a plurality of switches and terminals, and a control network assigned to the control units and is separate from the local networks. Herein, the local networks are each configured to ensure that communication within the respective local network is implicitly authorized based on an assignment of the respective terminals to the same local network.

The terminals of the communication system in accordance with the invention are each assigned a zero trust adapter, which is configured to capture status information pertaining to the terminal, to forward the status information pertaining to the terminal via the control network to the control unit for evaluation and the terminal to authenticate the terminal to the control unit or to communication partners. In contrast, the control unit is configured to determine a trust score for each of the terminals based on the status information and to apply rules dependent on the trust score for configuration or for permissible communication relationships of the terminals. The communication system is preferably configured to ensure that communication relationships of the terminals with communication partners outside their respective local network are authorized in accordance with the rules applied by the control unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below with reference to an exemplary embodiment and with reference to the drawing, in which:

FIG. 4 is an exemplary illustration of a determination of a trust score for a plurality of terminals based on status information in accordance with the invention;

FIG. 5 is an illustration of exemplary rules dependent on the trust score that are applied by the control unit in accordance with the invention.

DETAILED DESCRIPTION OF THE EXEMPLARY EMBODIMENTS

Figure 1:
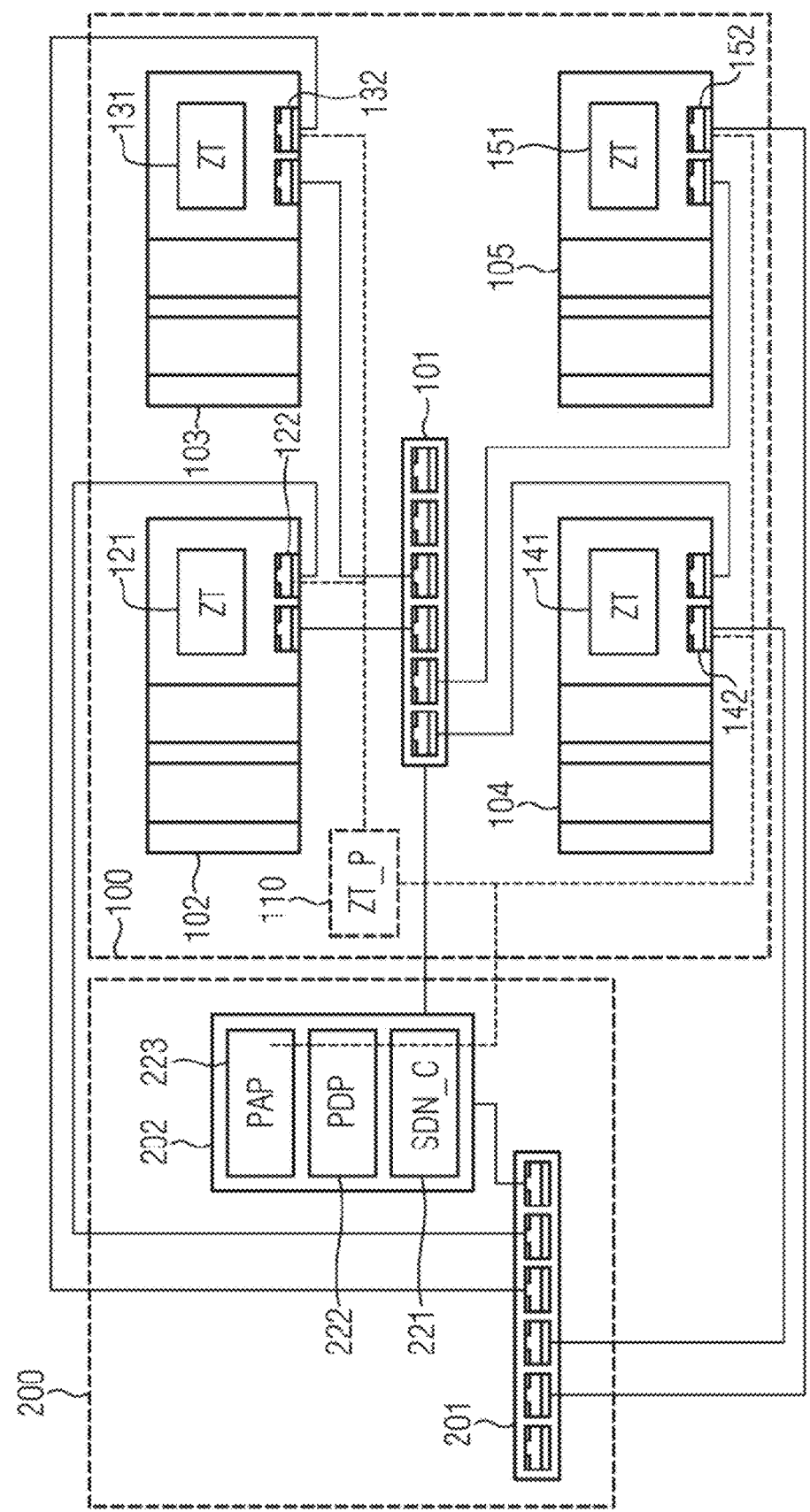
FIG. 1 is a schematic illustration of a communication system with a local network comprising a switch and a plurality of terminals, a control network, a control unit and zero trust adapters integrated into the terminals in accordance with the invention.

In principle, the communication system depicted in FIG. 1 has a plurality of local networks 100 each comprising a switch 101 and a plurality of terminals 102, 103, 104, 105 connected thereto, a control unit 202 and a control network 200 assigned to the control unit 202. In the present exemplary embodiment, communication within the local networks 100 is implicitly authorized based on an assignment of the respective terminals 102, 103, 104, 105 to the same local network. For reasons of clarity, FIG. 1 only shows one local network 100 by way of example.

The control network 200 is advantageously completely separate from the local networks 100. For this purpose, the terminals 102, 103, 104, 105 are each connected to the control network 200 via a dedicated port 122, 132, 142, 152. Similarly, the switches 101 of the local networks 100 are each connected via a dedicated port to the control unit 202 comprised by the control network 200.

The terminals 102, 103, 104, 105 are in particular physical or virtual hosts that can provide data or resources for other hosts. The data or resources can, for example, be assigned to services or control and monitoring applications of an industrial automation system, which are examples of time-critical services or applications.

In the present exemplary embodiment, the terminals 102, 103, 104, 105 implement functions of control devices of an industrial automation system, such as programmable logic controllers, or of field devices, such as sensors or actuators. Herein, the terminals 102, 103, 104, 105 are used to exchange control and measurement variables with machines or apparatuses controlled by control devices. In particular, the control devices are provided for determining suitable control variables from captured measurement variables.

Alternatively or additionally, the terminals 102, 103, 104, 105 can each implement an operating and monitoring station and can be used to visualize process data or measurement and control variables that are processed or captured by control devices or other automation devices. In particular, an operating and monitoring station can be used to display values of a control loop and to change control parameters or programs.

The switches 101 of the local networks 100 and the terminals 102, 103, 104, 105 are preferably assigned to a software-defined network (SDN) that comprises a communication control plane referred to as the control plane and a data transmission plane referred to as the data plane. Herein, the control unit 202 comprises an SDN controller 221 and is assigned to the control plane, while the switches 101 and terminals 102 are assigned to the data plane. In principle, network infrastructure devices other than switches, such as routers, can be assigned to the data plane. The control unit 202 can specify flow tables, in particular for routers or switches, from which routing tables or forwarding tables for infrastructure devices assigned to the control unit network are derived.

In general, the control unit 202 controls functions of a plurality of switches 101, 201 and terminals 102, 103, 104, 105. In accordance with the exemplary embodiment depicted in FIG. 1, the control unit 202 is connected via a switch 201 assigned to the control network 200 and via the dedicated ports 122, 132, 142, 152 to the terminals 102-105 or to zero trust adapters 121, 131, 141, 151, which are each provided for each terminal 102-105. Herein, the zero trust adapters 121, 131, 141, 151 are integrated into the respective terminal 102-105 as hardware or software components, in particular as combined hardware and software components. Alternatively, the zero trust adapters for a plurality of terminals 102-105 can be combined in a common zero trust proxy 110. This is indicated in FIG. 1 by dashed connections between the zero trust proxy 110 and the dedicated ports 122, 132, 142, 152 of the terminals 102-105.

The zero trust adapters 121, 131, 141, 151 each capture status information pertaining to the assigned terminal 102-105, forward the status information via the control network 200 to the control unit 202 for evaluation and authenticate the respective terminal 102-105 on behalf of the control unit 202 or to communication partners. The status information can in particular comprise log files that are collected by the respective zero trust adapter 121, 131, 141, 151 and forwarded to the control unit 202. The status information is preferably preprocessed by the respective zero trust adapter 121, 131, 141, 151 for the control unit 202. Here, only the preprocessed status information or meta information extracted from the status information is forwarded to the control unit 202 for evaluation.

The control unit 202 determines a trust score for each of the terminals 102, 103, 104, 105 based on the status information and applies rules dependent on the trust score for configuration or for permissible communication relationships of the terminals. In particular, communication relationships of the terminals 102, 103, 104, 105 with communication partners outside their respective local network 100 are authorized in accordance with the rules applied by the control unit 202. Moreover, the functions of the switches 101 of the local networks 100 or the terminals 102, 103, 104, 105 are also controlled in accordance with the rules applied by the control unit 202. Preferably, the rules dependent on the trust score are only applied after a successful terminal authentication in each case. In the event of a failed terminal authentication, a warning can, for example, be issued in each case. Alternatively, in the event of a failed terminal authentication, the SDN controller 221 can be prompted to interrupt communication of the respective terminal via the data plane, i.e., to actively intervene in the communication.

The rules applied by the control unit 202 are in particular specified by security policies. In the present exemplary embodiment, these security policies are managed via a policy administration point (PAP) 223 integrated into the control unit 202 and define which terminals or users require access to which data or resources. Herein, the status information is evaluated based on the security policies by a policy decision point (PDP) 222 that is comprised by the control facility 202. The security policies are enforced by the SDN controller 221 as a policy enforcement point (PEP).

Figure 2:
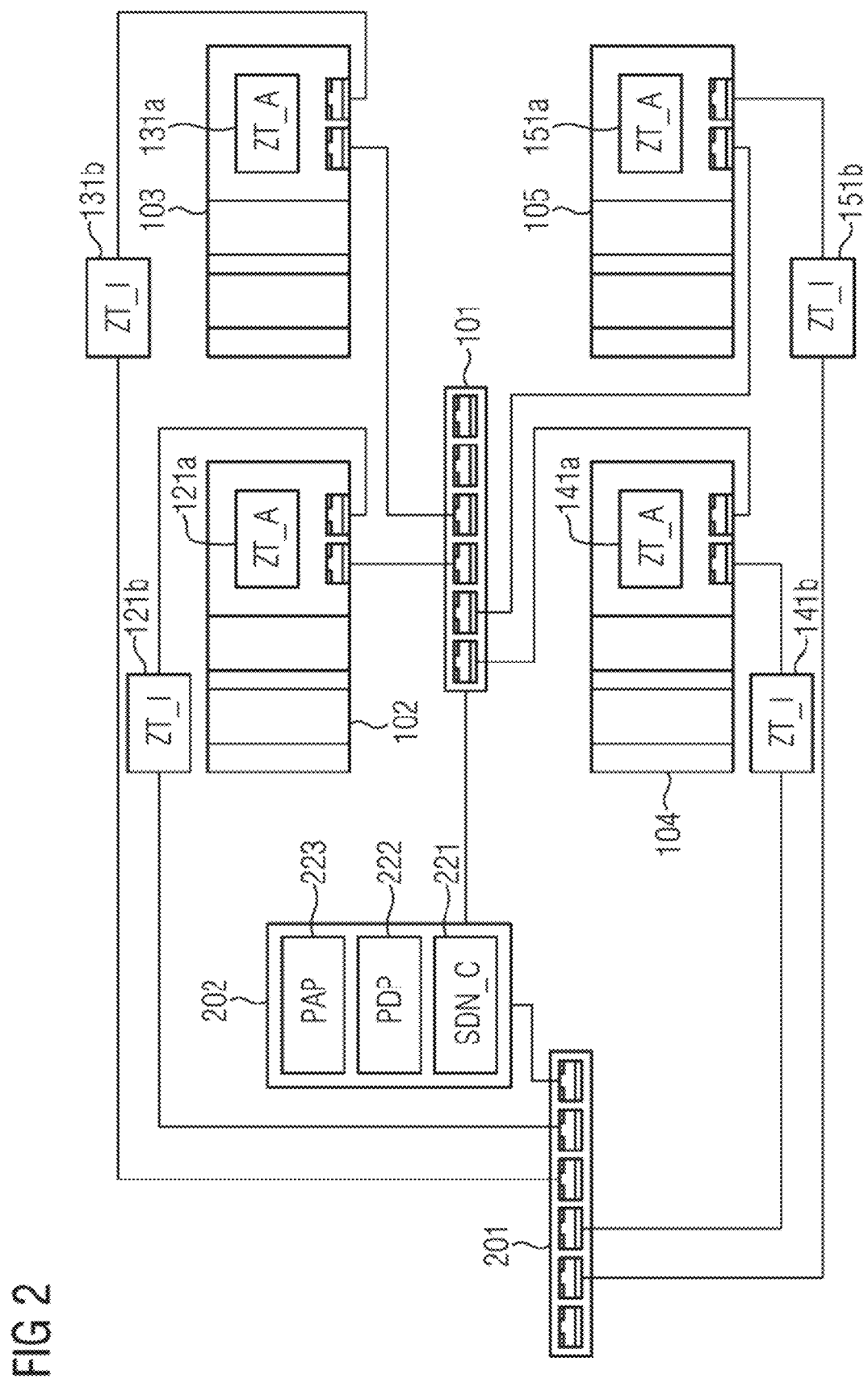
FIG. 2 is an illustration of an alternative embodiment of the communication system of FIG. 1 with zero trust adapters not fully integrated into the terminals.

In accordance with the alternative exemplary embodiment depicted in FIG. 2, the control unit 202 is connected to the dedicated ports 122, 132, 142, 152 of the terminals 102, 103, 104, 105 via the switch 201 of the control network 200 and via zero trust interface apparatuses 121b, 131b, 141b, 151b.

In this exemplary embodiment, the zero trust adapters are each divided into a zero trust agent 121a, 131a, 141a, 151a, which captures the status information and is integrated into the respective terminal 102-105, and a zero trust interface device 121b, 131b, 141b, 151b that is separate from the respective terminal 102, 103, 104, 105 and authenticates the terminal 102-105.

Figure 3:
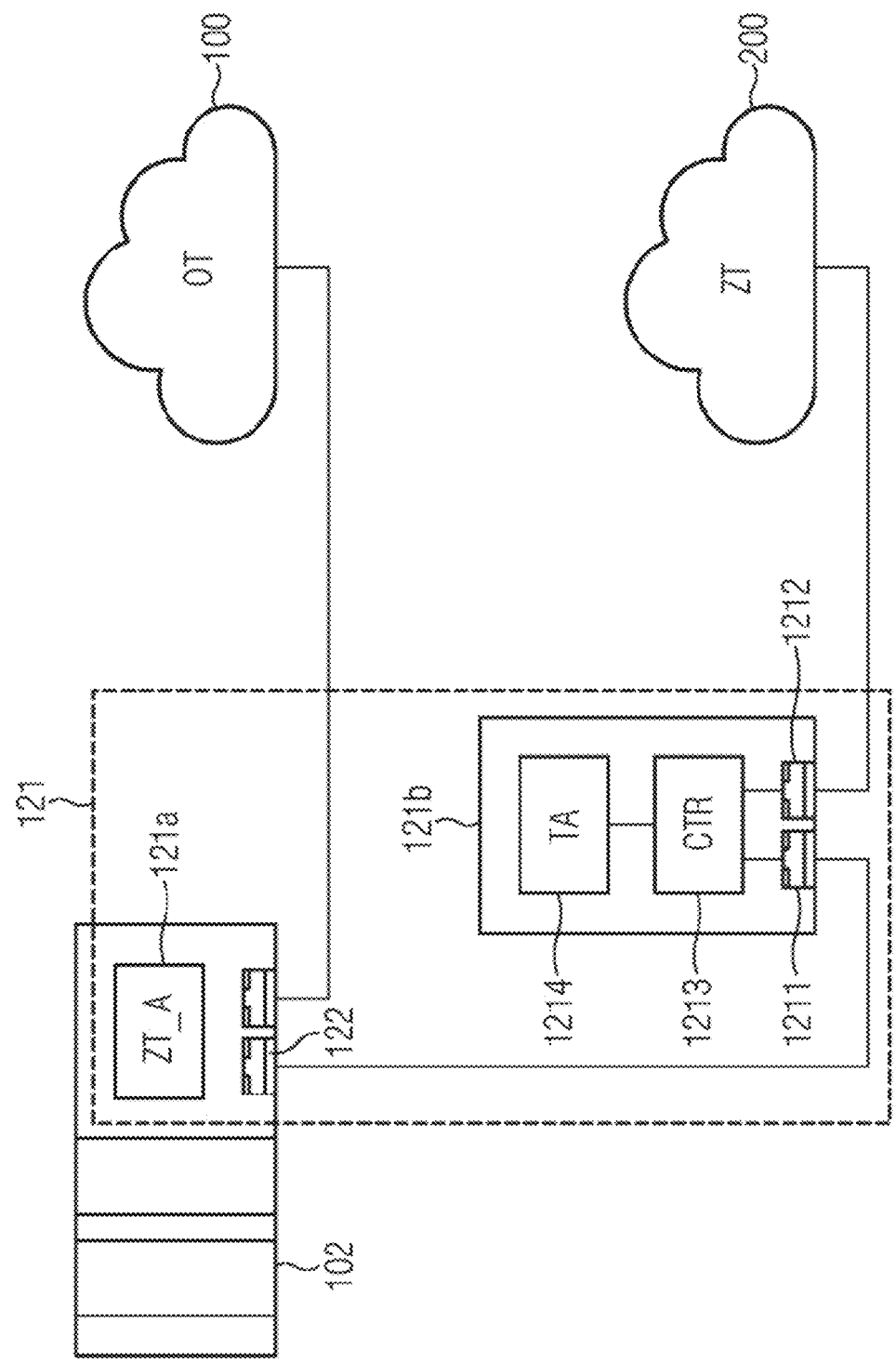
FIG. 3 is a schematic illustration of a detailed view of a terminal and an assigned zero trust interface device of the communication system depicted in FIG. 2.

FIG. 3 depicts a terminal 102 and a zero trust interface device 121b of the communication system according to FIG. 2 in detail by way of example. In addition to a dedicated port 1211 for the assigned terminal 102, a dedicated port 1212 for the control network 200 and a control module 1213, the zero trust interface device 121b comprises a trust anchor 1214 for storing adapter-specific or terminal-specific key material. Such a trust anchor can also be integrated into the zero trust adapters 121, 131, 141, 151 of the communication system depicted in FIG. 1. Overall, key material for authenticating the terminals 102, 103, 104, 105 does not need to be stored there, but can be securely managed by each of the assigned zero trust adapters 121, 131, 141, 151 or the respective zero trust interface device 121b, 131b, 141b, 151b.

In order to determine a trust score based on status information for a plurality of exemplary terminals, network configuration data, such as network adapter ID 401 and IP address 402 on the one hand, and on the other hand, software installation data, such as operating system 403, operating system version 404 and software version 405 of the respective zero trust adapter or zero trust agent, installed virus scanners 406 and last scan results 407, can be evaluated in accordance with FIG. 4. The trust score 408 for the respective terminal is calculated based on this data. In the present exemplary embodiment, a relatively low trust score of 50 is calculated for a first terminal based on an older operating system version, while a higher trust score of 85 is determined for a second terminal with a more recent operating system version. A higher trust score of 85 can also be calculated for a third terminal with an older operating system version, but with an installed virus scanner and a positive last scan result. The method of calculating the trust score can in principle be adapted to individual application requirements.

FIG. 5 depicts by way of example four of the rules that are dependent on the trust score and are applied by the control unit. Here, in each case a rule ID 501, source IP addresses 502, destination IP addresses 503, destination ports 504, communication protocols 505 permitted by the respective rules and a trust score threshold 506 must be observed. According to rule 1, terminals with a determined trust score of at least 80 can communicate with a terminal with IP address 10.10.1.20 via the communication protocol Open Platform Communications Unified Architecture (OPC UA) and the destination port 4840. In contrast, according to rule 2, terminals with a determined trust score of at least 65 may only communicate with the terminal with IP address 10.10.1.20 via the communication protocol DCOM and the destination port 135.

According to rule 3, terminals with a determined trust score of at least 70 may communicate with a terminal with the IP address 10.10.1.25 via the communication protocol OPC UA and the destination port 4840. Moreover, rule 4 provides, for example, that communication between the terminal with the IP address 10.10.1.25 and a terminal with the IP address 10.10.1.30 via the communication protocol OPC UA and the destination port 4840 is permitted, provided that the calculated trust score for the terminal with the IP address 10.10.1.25 is at least 85.

In accordance with the above rule, communication for terminals with lower calculated trust scores than the respective trust score threshold is in principle blocked. In order to avoid conflicts between the rules, their application is advantageously prioritized according to the rule ID. The rules applied by the control unit can in principle also be adapted to individual application requirements.

Figure 6:
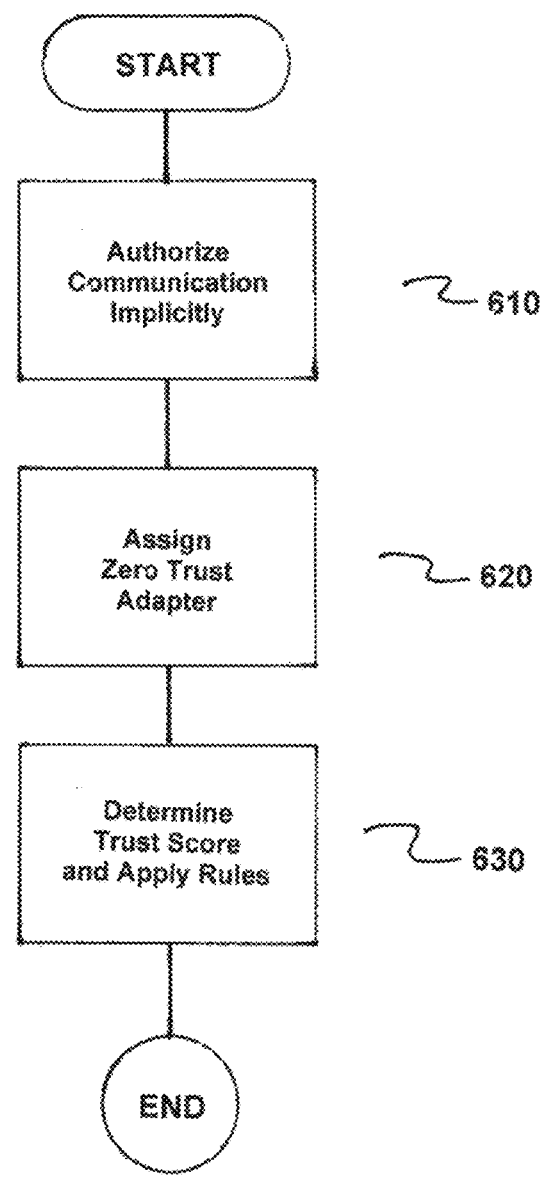
FIG. 6 is a flowchart of the method in accordance with the invention.

FIG. 6 is a flowchart of the method for securely transmitting time-critical data within a communication system comprising a plurality of local networks 100 that each comprises at least one switch 101 and a plurality of terminals 102, 103, 104, 105, a control unit 202 that controls functions of a plurality of switches and terminals, and a control network 200 that is assigned to the control unit 202 and separate from the plurality of local networks 100.

The method comprises authorizing implicitly communication within the plurality of local networks 100 based on an assignment of respective terminals to the same local network, as indicated in step 610.

Next, a zero trust adapter that captures status information pertaining to a terminal, forwards the status information via the control network 200 to the control unit 202 for evaluation and authenticates the terminal to the control unit and/or communication partners is assigned to each terminal 121, 131, 141, 151, as indicated in step 620.

Next, the control unit 202 determines a trust score for each of the plurality of terminals based on the status information and applies rules for configuration and/or permissible communication relationships of the terminals, as indicated in step 630. In accordance with the method the rule are dependent on the trust score.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for securely transmitting time-critical data within a communication system comprising a plurality of local networks which each comprises at least one switch and a plurality of terminals, a control unit which controls functions of a plurality of switches and terminals, and a control network which is assigned to the control unit and separate from the plurality of local networks, the method comprising:
　　authorizing implicitly communication within the plurality of local networks based on an assignment of respective terminals to the same local network;
　　assigning a zero trust adapter to each terminal which captures status information pertaining to a terminal, forwards the status information via the control network to the control unit for evaluation and authenticates the terminal to at least one of the control unit and communication partners; and determining, by the control unit, a trust score for each of the plurality of terminals based on the status information and applying rules for at least one of configuration and permissible communication relationships of the plurality of terminals, said rules being dependent on the trust score.

2. The method as claimed in claim 1, wherein communication relationships of the plurality of terminals with communication partners outside their respective local network are authorized in accordance with the rules applied by the control unit.

3. The method as claimed in claim 1, wherein the status information is preprocessed by the respective zero trust adapter for the control unit; and wherein only at least one of the preprocessed status information and meta information extracted from the status information is forwarded to the control unit for evaluation.

4. The method as claimed in claim 2, wherein the status information is preprocessed by the respective zero trust adapter for the control unit; and wherein only at least one of the preprocessed status information and meta information extracted from the status information is forwarded to the control unit for evaluation.

5. The method as claimed in claim 1, wherein the plurality of terminals are each connected to at least one of (i) a zero trust interface device and (ii) the control network via a dedicated port.

6. The method as claimed in one claim 1, wherein the zero trust adapters are each integrated as at least one of hardware and software components into the respective terminal.

7. The method as claimed in claim 1, wherein the zero trust adapters each comprise a zero trust agent integrated into the respective terminal, which captures the status information, and a zero trust interface device separate from the respective terminal, which authenticates the respective terminal.

8. The method as claimed in claim 1, wherein the zero trust adapters for the plurality of terminals are combined in a common zero trust proxy.

9. The method as claimed in claim 1, wherein the zero trust adapters each comprise a trust anchor for at least one of storing adapter-specific and terminal-specific key material.

10. The method as claimed in claim 1, wherein the rules are specified by security policies defining at least one of which terminals and which users require access to at least one of which data and which resources.

11. The method as claimed in claim 10, wherein the status information is evaluated based on the security policies by a policy decision point assigned to a control facility; and wherein the security policies are enforced by the control facility as a policy enforcement point.

12. The method as claimed in claim 1, wherein the functions of at least one of the terminals and switches are controlled in accordance with the rules applied by the control unit.

13. The method as claimed in claim 1, wherein the rules dependent on the trust score are each only applied after a successful terminal authentication; and wherein a warning is issued in an event of each failed terminal authentication.

14. The method as claimed in claim 13, wherein the switches of the plurality of local networks are assigned to a software-defined network comprising a communication control plane forming a control plane, and a data transmission plane forming a data plane; wherein the control unit is assigned to the control plane; and wherein the switches are assigned to the data plane.

15. The method as claimed in claim 14, wherein the control unit specifies flow tables from which at least one of routing tables and forwarding tables for network infrastructure devices assigned to the control unit are derived; and wherein the network infrastructure devices comprise at least one of routers and switches.

16. A communication system for securely transmitting time-critical data, the communication system comprising:
a plurality of local networks each comprising at least one switch and a plurality of terminals, a control unit which controls the functions of a plurality of switches and terminals, and a control network assigned to the control unit and separate from the plurality of local networks;
wherein the local networks are each configured to ensure that communication within a respective local network is implicitly authorized based on an assignment of the respective terminals to the same local network;
wherein the terminals are each assigned a zero trust adapter configured to capture status information pertaining to a terminal, to forward the status information via the control network to the control unit for evaluation and to authenticate the terminal to at least one of the control unit and communication partners;
wherein the control unit is configured to determine a trust score for each of the plurality of terminals based on the status information and to apply rules for at least one of configuration and permissible communication relationships of the terminals, said rules being dependent on the trust score.

17. An adapter for the terminal of the communication system as claimed in claim 16, wherein the adapter is configured to be assigned to the terminal as a zero trust adapter; and
wherein the adapter is further configured to capture status information pertaining to the terminal, to forward the status information pertaining to the terminal via the control network to the control unit for evaluation and to authenticate the terminal to at least one of the control unit and communication partners.

* * * * *